(12) United States Patent
Bayang et al.

(10) Patent No.: US 8,373,941 B2
(45) Date of Patent: Feb. 12, 2013

(54) AUTOMATIC UNTHREAD TO SECURE TAPE FROM STICKING TO THE HEAD

(75) Inventors: Josephine Faith Bayang, Tucson, AZ (US); Ernest Gale Stewart, Tucson, AZ (US); Eiji Ogura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1238 days.

(21) Appl. No.: 12/177,931

(22) Filed: Jul. 23, 2008

(65) Prior Publication Data

US 2010/0020662 A1    Jan. 28, 2010

(51) Int. Cl.
   *G11B 15/62*    (2006.01)
(52) U.S. Cl. ........................................................ 360/71
(58) Field of Classification Search .................. None
   See application file for complete search history.

(56) References Cited

U.S. PATENT DOCUMENTS

| | | | |
|---|---|---|---|
| 4,125,881 A | | 11/1978 | Eige et al. |
| 5,739,970 A * | | 4/1998 | Kobayashi et al. ........... 360/74.1 |
| 5,923,494 A * | | 7/1999 | Arisaka et al. .............. 360/78.02 |
| 6,137,649 A * | | 10/2000 | Saito et al. .................... 360/74.1 |
| 6,147,830 A * | | 11/2000 | Kobayashi et al. .......... 360/73.07 |
| 6,493,167 B2 * | | 12/2002 | Kobayashi et al. ........... 360/72.3 |
| 6,661,596 B2 * | | 12/2003 | Chliwnyj et al. ............. 360/74.3 |
| 7,391,585 B1 * | | 6/2008 | Bayang et al. .................... 360/71 |
| 7,405,895 B2 * | | 7/2008 | Anami ............................ 360/71 |
| 7,433,146 B2 * | | 10/2008 | Bayang et al. .................... 360/71 |
| 7,564,640 B2 * | | 7/2009 | Kitahara ......................... 360/70 |
| 7,586,708 B1 * | | 9/2009 | Dugar et al. .................... 360/74.2 |
| 7,656,602 B2 * | | 2/2010 | Iben et al. ....................... 360/66 |
| 7,733,594 B2 * | | 6/2010 | Fasen et al. ..................... 360/71 |
| 7,764,456 B2 * | | 7/2010 | Bayang et al. .................... 360/71 |
| 7,986,482 B2 * | | 7/2011 | Bayang et al. .................... 360/71 |
| 2008/0223968 A1 * | | 9/2008 | Bui et al. ..................... 242/332.1 |

* cited by examiner

*Primary Examiner* — Hoa T Nguyen
*Assistant Examiner* — James L Habermehl
(74) *Attorney, Agent, or Firm* — Hamilton & Terrile, LLP; Stephen A. Terrile

(57) ABSTRACT

A system and method for automatically unthreading a tape. The system and method determine whether the drive being at the stop state could cause the tape sticking condition in future after a defined dwell time (e.g., 20 minutes). The tape sticking tends to increase with time and humidity. Moreover, it is known that worn tape is stickier than new tape. With a plurality of attempts (e.g., four attempts) of moving tape (e.g., every 5 minutes), the drive is able to identify whether the tape needs to be unthreaded. Such a system allows a tape drive to handle the tape in safety at severe condition for the sticking tape, and minimize the penalty for the response to the command in normal condition.

19 Claims, 3 Drawing Sheets

AUTOMATIC UNTHREAD TO SECURE TAPE FROM STICKING TO THE HEAD

BACKGROUND OF THE INVENTION

1. Field of the Invention

The present invention relates in general to enhancing the performance of a data-recording device, and in particular to automatically unthreading tape within a data-recording device.

2. Description of the Related Art

Data recording devices, such as data tape drives, record information to or read information from a data storage device, such as the data tape of a tape cartridge. As data tapes have become increasingly thinner, they have become more susceptible to damage.

In a tape drive system, areal density is increasing for magnetic tape, so it becomes desirable to provide the tape drive system with smoother media and head. At some point, the tape may adhere to the head, especially at humid conditions. Two smooth surfaces are rubbed against each other squeezing out the lubricating air interface thus causing the two smooth surfaces to stick. Once that tape sticks to the head, the drive can drop tension because the drive cannot move the tape. This leaves the drive with a stuck tape, which is an extremely undesirable condition to a user. The sticking effect may be accentuated by thin media, because of tighter head to tape conforming. Once stuck to the head, the risk to breaking the tape is very high.

SUMMARY OF THE INVENTION

In accordance with the present invention, a system and method for automatically unthreading a tape is set forth. The method determines whether the drive being at the stop state could cause the tape sticking condition in the future. The tape sticking tends to increase with time and humidity. Moreover, it is known that worn tape is stickier than new tape. With a plurality of attempts (e.g., four attempts) of moving the tape (e.g., every 5 minutes), thus providing a defined dwell time (e.g., 20 minutes), the drive is able to identify whether the tape needs to be unthreaded. Such a system allows a tape drive to handle the tape in safety at severe conditions for the sticking tape, and minimize the penalty for the response to the command in normal condition. The dwell time is determined as a length of time that is shorter than the time at which a sticky condition would likely appear (e.g., in certain drive systems around one hour of inactivity), but long enough to indicate that drive operation is not performance sensitive.

When operating, the tape runs normally and stops normally. The drive is ready to respond to a new motion request all the time while tape is stopped. When a predetermined amount of time (e.g., 5 minutes) passes without a new tape motion request, the tape is moved slightly to break any head/tape stick seal. This motion is performed by increasing current to the reel motors slowly in an open loop fashion to move the reels. In certain embodiments, Hall effect sensors are used to detect that both reels move. At that time, a current value of the reel motors (i.e., a value of the current drawn by each motor) is saved. The current value is used to determine whether the tape is in the sticky condition or not. If the tape is in a sticky condition, then an adherent indicia (e.g., a 'sticky flag') is set. The drive then returns to a stopped state. The drive performs this operation regularly (e.g., every 5 minutes). When a certain total amount of time (e.g., 20 minutes) elapses, the drive judges whether the tape should be unthreaded or not by using the sticky indicia. If the sticky indicium is set, tape is unthreaded. If the adherent indicium is not set, then the tape remains in a stopped state until a new request is received.

More specifically, in one embodiment, the invention relates to a computer-implementable method which includes determining whether a drive being at a stop state could cause a media adherent condition; attempting to move the media relative to a media head; monitoring an amount of energy needed to move the media relative to the media head; and, generating an adherent indicia if the amount of energy needed to move the media exceeds a threshold amount of energy.

In another embodiment, the invention relates to a tape drive for reading information from and/or writing information to a tape drive of a tape cartridge. The tape drive includes a transducer head for processing information with the data tape; a drive motor, the drive motor enabling moving the data tape of the tape cartridge relative to the transducer head; and a drive control unit, the drive control unit controlling the drive motor. The drive control unit includes an automatic unthread system, the automatic unthread system detecting a tape stick condition and controlling the tape drive to automatically unstick the tape upon detection of the tape stick condition.

In another embodiment, the invention relates to a computer-usable medium embodying computer program code. The computer program code includes computer executable instructions configured for determining whether a drive being at a stop state could cause a media adherent condition; attempting to move the media relative to a media head; monitoring an amount of energy needed to move the media relative to the media head; and, generating an adherent indicia if the amount of energy needed to move the media exceeds a threshold amount of energy.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
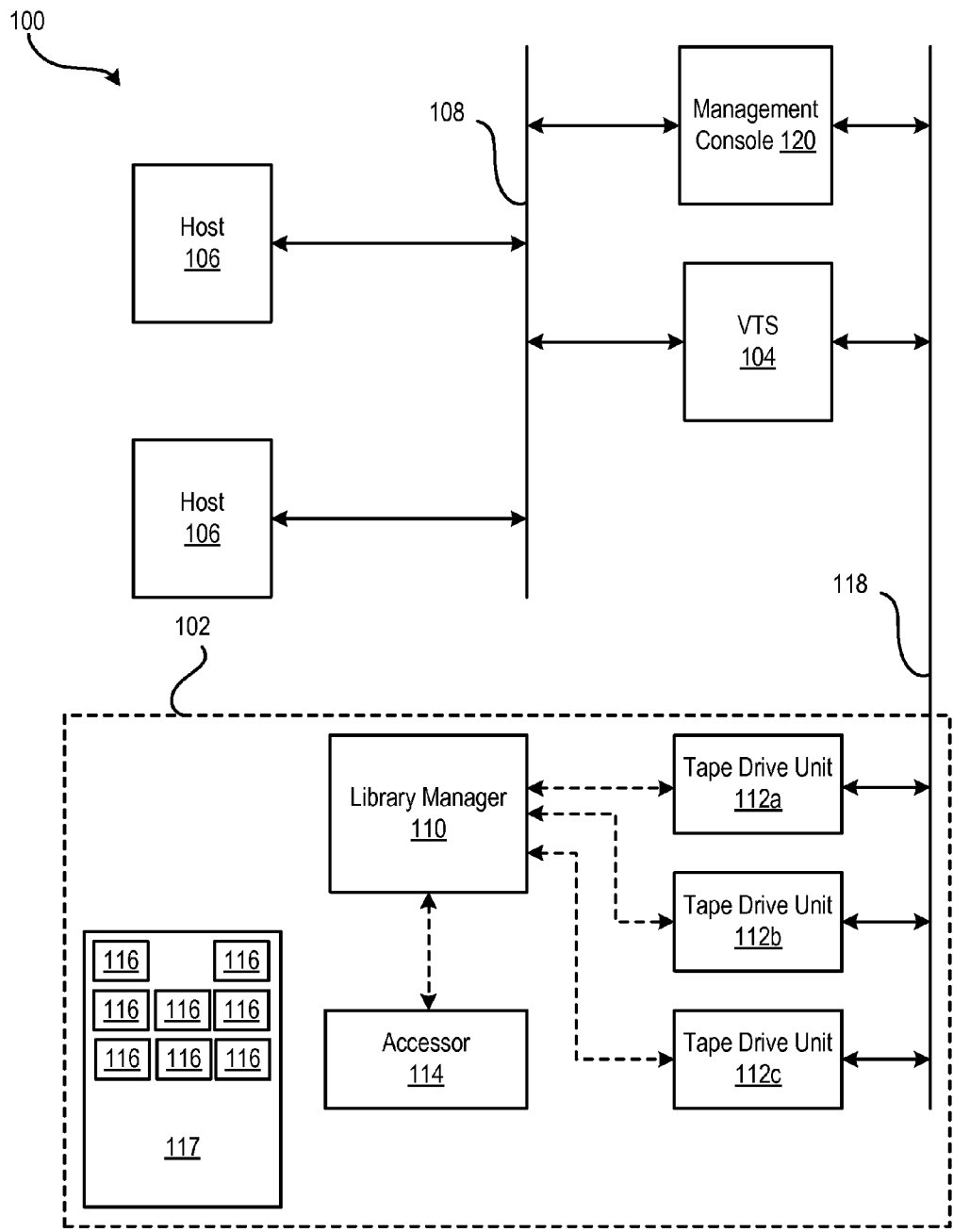
FIG. 1 is a schematic block diagram illustrating a representative virtual tape server system.

FIG. 1 illustrates a schematic block diagram of a representative virtual tape system 100. The system 100 includes at least one automated library unit 102, at least one virtual tape server 104, and at least one host 106. Each host 106 may be a mainframe computer. Alternatively, the host 106 may be a server or personal computer using a variety of operating systems. The host 106 and the virtual tape server 104 are connected via a storage area network (SAN) 108 or similar communications channel.

The automated tape library unit 102 includes a library manager 110, one or more data recording devices, which may be tape drive units 112, an accessor 114, and a plurality of media cartridges 116. The plurality of media cartridges 116 may be stored in one or more media cartridge storage bins 117.

The system 100 also includes a management console 120. The management console 120 may be a server or personal computer using a variety of operating systems.

The library manager 110 is interconnected with, and controls the actions of, the tape recording units 112 and the accessor 114. The library manager 110 typically also includes one or more hard disk drives (not shown) for memory storage, as well as a control panel or keyboard (not shown) to provide user input. The control panel may be a computer in communication with the library manager 110 so that a user can control the operating parameters of the automated tape library unit 102 independently of the host 106.

The automated tape library unit 102 is shown with three tape drive units 112a, 112b, and 112c. The present invention is operable with one or any larger number of tape drive units 112. The tape drive units 112 may share one single repository of cartridges 116. Alternatively, the tape drive units 112 may independently correspond to and utilize multiple repositories of cartridges 116. The tape drive units 112 may be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the virtual tape server 104 and the tape drive units 112 via a network 118, which may be a storage area network (SAN), a local area network (LAN), a wide area network (WAN), or a different type of network, such as the Internet or a direct connection between the virtual tape server 104 and the tape drive devices 112.

The accessor 114 may be a robotic arm or other mechanical device configured to transport a selected cartridge 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 112. The tape drive units 112 may be replaced by optical disk drives or other magnetic drives. Similarly, the cartridges 116 may contain magnetic media, optical media, or any other removable media corresponding to the type of drive employed.

Figure 2:
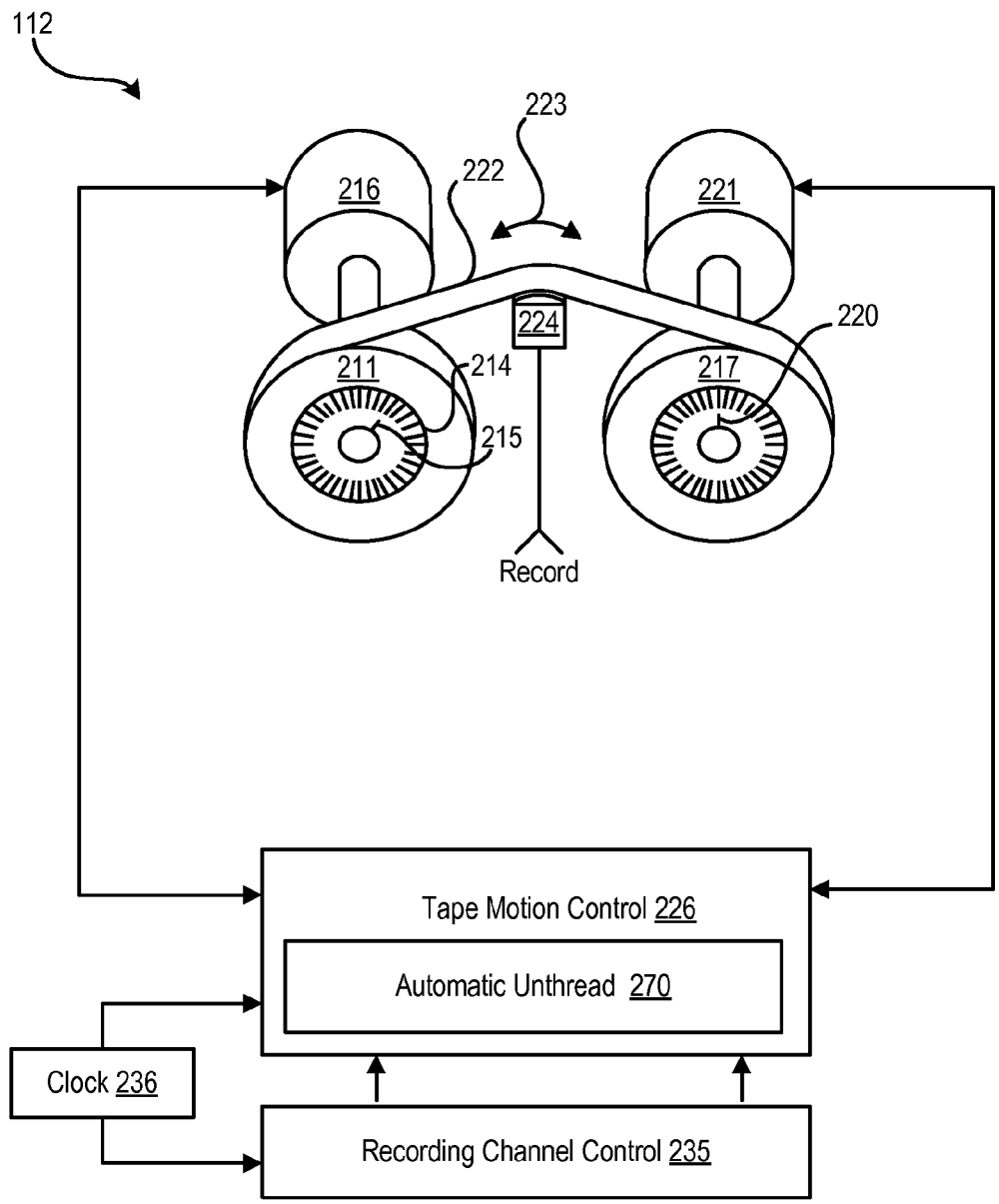
FIG. 2 shows a block diagram of a tape drive having a system for automatically unthreading tape within a data-recording device.

Referring to FIG. 2, a tape drive unit 112 is shown. More specifically, the tape drive unit includes a pair of reels 211, 217, each driven by a bi-directional motor 216, 221, respectively. Mounted to the drive shaft of each of the motors 216 and 221 is an index line 215, 220 displayed radially inward on a respective coding wheel. A tape 222 is wound to the reels 211, 217 and the motors 216, 221 are controlled to move the tape 222 for recording and playback in either of the two directions indicated by the arrow 223.

If tape 222 is being advanced from the reel 211 to the reel 217 for recording data through a magnetic write/read record head 224 positioned between the reels 211 and 217 in engagement with a recording surface of the tape 222. The reel 211 is the "supply" reel while the reel 217 is the "take-up" reel. Also, after a complete longitudinal track of data has been written on the tape 222 while the tape is being fed from the reel 211 to the reel 217. To continue recording without rewinding the tape, the direction of the tape motion is reversed while recording continues, that data is written while the tape is advanced from the reel 217 (which now becomes the supply reel) to the reel 211 (now the take-up reel). Another complete longitudinal track of data, parallel to the first data track is written on the tape, and the tape motion is once again reversed, and so on.

During advancement of the tape 222, various parameters, such as a tape motion, position, tension, are monitored to derive motor currents having the polarity and magnitude necessary to operate the motors 216, 221 while recording data on the tape 222. Under normal operating conditions, the tape motion control unit 226 operates to maintain the motors 216 and 221 at constant nominal velocities for recording, reading, and searching. In addition, unit 226 controls the motors 216 and 221 to perform the back hitch operation described above in response to a signal indicating the last data record, which is provided by a recording channel control unit 235. Recording channel control unit 235 provides a record signal for driving the magnetic write/read head 224 and generates signals for synchronizing recording operations with tape motion, one of the signals indicating the writing of a last data record. A clock unit 236 provides clock pulses to the tape motion control unit 226 and the recording channel control unit 235 for synchronization of their operations.

During a back hitch operation, when the recording is interrupted, the motion of the tape 222 is stopped to await the next record operation. When the last data record has been written, the control unit 226 operates the motors 216 and 221 to decelerate and stop the motion of the tape 222 and to move the tape in the reverse direction to a point where the tape is stopped to await the next record operation.

Additionally, the tape motion control unit 226 includes an automatic unthread system 270. The automatic unthread system 270 enables detection of a tape stick condition as well as a mechanism for automatically unsticking the tape 222.

Figure 3:
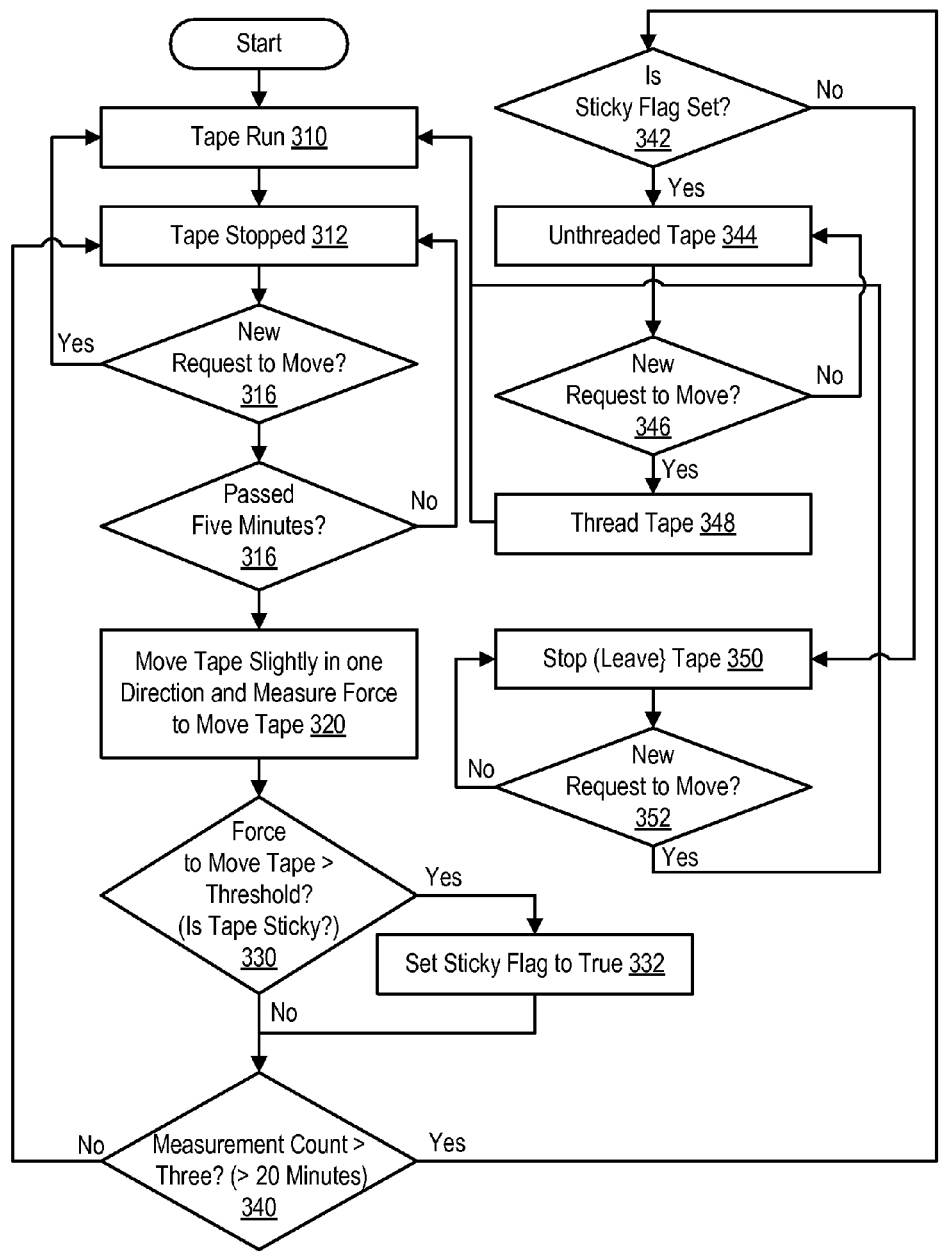
FIG. 3 shows a flow chart of the operation of the system for automatically unthreading tape within a data-recording device.

Referring to FIG. 3, a flow chart of the operation of the system for automatically unthreading tape 270 within a data-recording device 112 is shown. The system 270 determines whether the drive being at the stop state could cause the tape sticking condition in future after a defined dwell time (e.g., 20 minutes). The tape sticking tends to increase with time and humidity. Moreover, it is known that worn tape is stickier than new tape. With a plurality of attempts (e.g., four attempts) of moving tape (e.g., every 5 minutes), the drive is able to identify whether the tape needs to be unthreaded. Such a system allows a tape drive to handle the tape in safety at severe condition for the sticking tape, and minimize the penalty for the response to the command in normal condition.

More specifically, when operating, the tape runs normally and stops normally at step 310. When the tape is stopped as determined at step 312, the drive determines when a new motion request is presented to the drive at step 314. When a predetermined amount of time (e.g., 5 minutes) passes without a new tape motion request as determined at step 316, the tape is moved slightly to break any head/tape stick seal at step 320.

When the tape is moved at step 320, the force necessary to move the tape is measured. This motion is performed by increasing current to the reel motors slowly in an open loop fashion to move the reels. In certain embodiments, Hall effect sensors may be used to detect that both reels move. At that time, a current value to the reel motors (i.e., a value of the current drawn by each motor) is saved. The current value is used to determine whether the tape is in the sticky condition or not. More generally, the system 270 determines whether the force necessary to move the tapes exceeds a predetermined threshold at step 330. If the force is exceeded then the tape is determined to be in an adherent condition (i.e., the tape 222 is sticking to the head 224.)

If the tape is in the adherent condition, then an adherent indicia (e.g., a sticky flag) is set at step 332. The drive then returns to a stopped state. The drive performs this operation regularly (e.g., every 5 minutes). When a certain total amount of time (e.g., 20 minutes) elapses as determined by step 340, the drive judges whether the tape should be unthreaded or not by using the adherent indicia. If the adherent indicia is set as determined at step 342, the tape is unthreaded at step 344. Next, the drive is monitored to determine whether a new request to move is received at step 346. If a new request to move is not received, then control returns to the unthread tape step 344. If a new request to move is received, then the system performs a thread tape operation at step 348 and returns operation to the run tape step 310.

If the adherent indicia is not set, then the tape remains in a stopped state at step 350 until new request is received at step 352, at which time, the system returns operation to the run tape step 310.

While the invention has been shown or described in only some of its forms, it should be apparent to those skilled in the art that it is not so limited, but is susceptible to various changes without departing from the scope of the invention. For example, the present invention also applies to optical tape.

For example, the automatic unthread system 270 can be configured to automatically recover from an unthreaded condition and to proceed as if the unthreading never occurred. Thus, the unthreading operation is transparent to any host coupled to the drive. Also for example, the automatic unthread system can be configured to determine whether a next command is an unthread command and if so, to know whether or not performance of this command is necessary based upon whether the automatic unthread system had previously performed an unthread operation. Also for example, the automatic unthread system can be configured to determine whether a next command is an unload command and if so, to know that an unthread operation has already been performed prior to completing the unload operation.

Also for example, the automatic unthread system can further determine whether a tape has a greater risk of sticking (e.g., an older tape) and can perform the automatic unthread operation more frequently than for a tape that has a lower risk of sticking.

Also for example, the automatic unthread system can be configured to provide this feature as a customer tunable feature. E.g., a customer having a drive which is located in more severe conditions might wish to have the tape moved more frequently or might wish the total dwell time to be reduced.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method comprising:
   determining whether a drive being at a stop state could cause a media adherent condition;
   attempting to move the media relative to a media head;
   monitoring an amount of energy needed to move the media relative to the media head; and,
   generating an adherent indicia if the amount of energy needed to move the media exceeds a threshold amount of energy.

2. The computer-implementable method of claim 1 further comprising:
   automatically unthreading the media when the adherent indicia is set.

3. The computer-implementable method of claim 1 wherein:
   the attempting is performed when a predetermined amount of time passes without receipt of a new media motion request.

4. The computer-implementable method of claim 1 wherein:
   the attempting to move the media is performed by increasing energy applied to the media device slowly in an open loop fashion.

5. The computer-implementable method of claim 4 wherein:
   the increasing energy applied to the media device comprises applying a current to a drive motor.

6. The computer-implementable method of claim 1 further comprising:
   repeating the attempting at regular intervals; and,
   after a number of regular intervals has transpired, determining whether to automatically unthread the media based upon the adherent indicia.

7. A tape drive for reading information from and/or writing information to a tape drive of a tape cartridge, the tape drive comprising:
   a transducer head for processing information with the data tape;
   a drive motor, the drive motor enabling moving the data tape of the tape cartridge relative to the transducer head;
   a drive control unit, the drive control unit controlling the drive motor, the drive control unit comprising an automatic unthread system, the automatic unthread system detecting a tape stick condition and controlling the tape drive to automatically unthread the tape upon detection of the tape stick condition, the automatic unthread system determining whether the drive being at a stop state could cause a media adherent condition, attempts to move the tape relative to a tape head, monitors an amount of energy needed to move the tape relative to the tape head and, generates an adherent indicia if the amount of energy needed to move the tape exceeds a threshold amount of energy.

8. The tape drive of claim 7, wherein:
   controlling the tape drive to automatically unstuck the tape comprises automatically unthreading the tape.

9. The tape drive of claim 8 wherein:
   the automatic unthread system attempts to move the tape when a predetermined amount of time passes without receipt of a new media motion request.

10. The tape drive of claim 8 wherein:
    the attempting to move the media is performed by increasing energy applied to the media device slowly in an open loop fashion.

11. The tape drive of claim 7 wherein:
    the automatic unthread system repeats attempting to move the tape at regular intervals; and,
    after a number of regular intervals has transpired, the automatic unthread system determines whether to automatically unthread the tape based upon the adherent indicia.

12. A non-transitory computer-usable medium embodying computer program code, the computer program code comprising computer executable instructions configured for:
  determining whether a drive being at a stop state could cause a media adherent condition;
  attempting to move the media relative to a media head;
  monitoring an amount of energy needed to move the media relative to the media head; and,
  generating an adherent indicia if the amount of energy needed to move the media exceeds a threshold amount of energy.

13. The non-transitory computer-usable medium of claim 12, wherein the embodied computer program code further comprises computer executable instructions configured for:
  automatically unthreading the media when the adherent indicia is set.

14. The non-transitory computer-usable medium of claim 12, wherein:
  the attempting is performed when a predetermined amount of time passes without receipt of a new media motion request.

15. The non-transitory computer-usable medium of claim 12, wherein:
  the attempting to move the media is performed by increasing energy applied to the media device slowly in an open loop fashion.

16. The non-transitory computer-usable medium of claim 15, wherein:
  the increasing energy applied to the media device comprises applying a current to a drive motor.

17. The non-transitory computer-usable medium of claim 12, wherein the embodied computer program code further comprises computer executable instructions configured for:
  repeating the attempting at regular intervals; and,
  after a number of regular intervals has transpired, determining whether to automatically unthread the media based upon the adherent indicia.

18. An apparatus comprising:
means for determining whether a drive being at a stop state could cause a media adherent condition;
means for attempting to move the media relative to a media head;
means for monitoring an amount of energy needed to move the media relative to the media head; and,
means for generating an adherent indicia if the amount of energy needed to move the media exceeds a threshold amount of energy.

19. A tape motion control unit comprising:
an automatic unthread system, the automatic unthread system detecting a tape stick condition and controlling a tape drive to automatically unthread a tape upon detection of the tape stick condition, the automatic unthread system detecting the tape stick condition by determining whether the drive being at a stop state could cause a media adherent condition, attempting to move the tape relative to a tape head, monitors an amount of energy needed to move the tape relative to the tape head and, generating an adherent indicia if the amount of energy needed to move the tape exceeds a threshold amount of energy.

* * * * *